(12) United States Patent
Batey et al.

(10) Patent No.: US 8,943,406 B2
(45) Date of Patent: *Jan. 27, 2015

(54) GENERATING USER HELP INFORMATION FOR CUSTOMIZED USER INTERFACE

(75) Inventors: Christopher M. Batey, Eastleigh (GB); Saurabh Bhasin, Chandigarh (IN); Christy Haragan, Hampshire (GB); Steven J. Horsman, Hampshire (GB); Keir Lawson, Edinburgh (GB); Katie Shepherd, Hampshire (GB); Christopher M. Webster, WInchester (GB)

(73) Assignee: International Business Machines Corporation, Armonk, NY (US)

( * ) Notice: Subject to any disclaimer, the term of this patent is extended or adjusted under 35 U.S.C. 154(b) by 274 days.

This patent is subject to a terminal disclaimer.

(21) Appl. No.: 13/107,088

(22) Filed: May 13, 2011
(Under 37 CFR 1.47)

(65) Prior Publication Data

US 2011/0289409 A1     Nov. 24, 2011

(30) Foreign Application Priority Data

May 13, 2010   (EP) ..................................... 10162767

(51) Int. Cl.
 *G06F 3/048* (2013.01)
 *G06F 9/44* (2006.01)
(52) U.S. Cl.
 CPC .................................. *G06F 9/4446* (2013.01)
 USPC ....................................................... 715/705
(58) Field of Classification Search
 CPC ..... G06F 9/4446; G06F 3/048; G06F 3/0481; G06F 3/04883
 USPC .......................................................... 715/705
 See application file for complete search history.

(56) References Cited

U.S. PATENT DOCUMENTS

| | | | |
|---|---|---|---|
| 6,335,738 B1 | 1/2002 | Englefield | |
| 2006/0004680 A1* | 1/2006 | Robarts et al. | 706/12 |
| 2006/0139312 A1* | 6/2006 | Sinclair et al. | 345/156 |

(Continued)

FOREIGN PATENT DOCUMENTS

CN          1310819          8/2001

OTHER PUBLICATIONS

IBM, "Mapping User Models to Eclipse* User Interface Components to Generate Role/Task-Focused User Interfaces", Ip.com, Inc., Feb. 16, 2009, IP.com No. IPCOM000179515D, 4 pages (Continued)

*Primary Examiner* — Omar Abdul-Ali
*Assistant Examiner* — Haimei Jiang
(74) *Attorney, Agent, or Firm* — Yee & Associates, P.C.; William J. Stock

(57) ABSTRACT

A method for generating user help information for a customized user interface, the customized user interface including one or more user interface components from a library of user interface components, the method comprising the steps of: associating library component help information with each user interface component in the library of user interface components; identifying component help information from the library component help information for each component in the customized user interface; aggregating the identified component help information into user help information for presentation to a user of the customized user interface.

13 Claims, 3 Drawing Sheets

(56) References Cited

U.S. PATENT DOCUMENTS

| | | | |
|---|---|---|---|
| 2007/0150833 A1* | 6/2007 | Kim | 715/808 |
| 2009/0132919 A1* | 5/2009 | Allen et al. | 715/708 |
| 2009/0183072 A1* | 7/2009 | Stephenson et al. | 715/708 |
| 2010/0100832 A1* | 4/2010 | Wang et al. | 715/764 |
| 2012/0204105 A1 | 8/2012 | Batey et al. | |

OTHER PUBLICATIONS

USPTO Final Office Action, U.S. Appl. No. 13/449,767, Apr. 3, 2013, 12 pages.

Non-final office action dated Nov. 26, 2012 regarding U.S. Appl. No. 13/449,767, 13 pages.

Chinese Office Action, Chinese Application No. 201110127741.2, Jun. 18, 2013, 10 pages.

Office Action, dated Jan. 17, 2014, regarding U.S. Appl. No. 13/449,767, 14 pages.

Final Office Action, dated Aug. 14, 2014, regarding U.S. Appl. No. 13/449,767, 15 pages.

Notice of Allowance, dated Oct. 29, 2014, regarding U.S. Appl. No. 13/449,767, 14 pages.

* cited by examiner

GENERATING USER HELP INFORMATION FOR CUSTOMIZED USER INTERFACE

BACKGROUND

1. Field

The present invention relates to the generation of user help information for software applications. In particular, it relates to generating user help information for customized user interfaces.

2. Description of the Related Art

Modularization and componentization of software applications has led to increased configurability at all levels of software architectures. The ability to plug-in required software components to tailor a solution to a particular use case or user provides highly configurable loosely coupled solutions.

One aspect of software that is becoming increasingly customizable is the user interface. Customized user interface generators provide user interfaces including only the features and facilities required by a particular user or class of users to undertake predetermined user tasks as part of a user role. User interface features not required by those tasks need not be included within the customized user interface. The generation of such customized user interfaces can occur dynamically and automatically based on definitions of user tasks and user interface components, updating as those definitions change.

Such dynamic and customized user interfaces can lead to frequent changes in the content and layout of the user interface and variability of the functions and features of user interface components. Thus, users will typically call upon help information such as may be provided with user interfaces of software applications to guide the user through their use of elements of the user interface. It is a technical challenge to provide appropriate help information for users of customized user interfaces including only information relevant to the user interface rendered for presentation to the user. Help information for user interface components not rendered to the user may preferably be excluded from help information.

This challenge can be addressed by generating custom help information for each customized user interface. However, such custom generation of help information is time consuming and expensive, especially where the user interface updates frequently or where there are associated translation requirements for help information in multiple languages.

An alternative approach to addressing this challenge is to render all help information sufficiently generic such that a change to the customized user interface does not render the help information invalid. However, such an approach inevitably leads to help information relating to irrelevant user interface components or features being present, and a level of generality of the help information may be so high as to leave the help information difficult to navigate and read or to render the help information generally unusable.

It would therefore be advantageous to provide help information for customized user interfaces without the drawbacks described above.

SUMMARY

The present invention accordingly provides, in a first aspect, a method for generating user help information for a customized user interface, the customized user interface including one or more user interface components from a library of user interface components, the method comprising the steps of: associating library component help information with each user interface component in the library of user interface components; identifying component help information from the library component help information for each component in the customizable user interface; aggregating the identified component help information into user help information for presentation to a user of the customized user interface.

Thus, in this way, only help information relevant to the user interface components within the user interface is presented to a user at runtime, so providing a source of relevant and dynamic help information for the user that changes in accordance with changes to the customized user interface, such as when the customized user interface is changed dynamically.

The present invention accordingly provides, in a second aspect, an apparatus for generating user help information for a customized user interface, the customized user interface including one or more user interface components from a library of user interface components, the apparatus comprising: an associator for associating library component help information with each user interface component in the library of user interface components; an identifier for identifying component help information from the library component help information for each component in the customizable user interface; an aggregator for aggregating the identified component help information into user help information for presentation to a user of the customized user interface.

The present invention accordingly provides, in a third aspect, an apparatus comprising: a central processing unit; a memory subsystem; an input/output subsystem; and a bus subsystem interconnecting the central processing unit, the memory subsystem, the input/output subsystem; and the apparatus as described above.

The present invention accordingly provides, in a fourth aspect, a computer program element comprising computer program code to cause the computer to perform, when loaded into a computer system and executed thereon, the steps of a method as described above.

BRIEF DESCRIPTION OF THE SEVERAL VIEWS OF THE DRAWINGS

A preferred embodiment of the present invention is described below in more detail, by way of example only, with reference to the accompanying drawings, in which.

DETAILED DESCRIPTION

Figure 1:
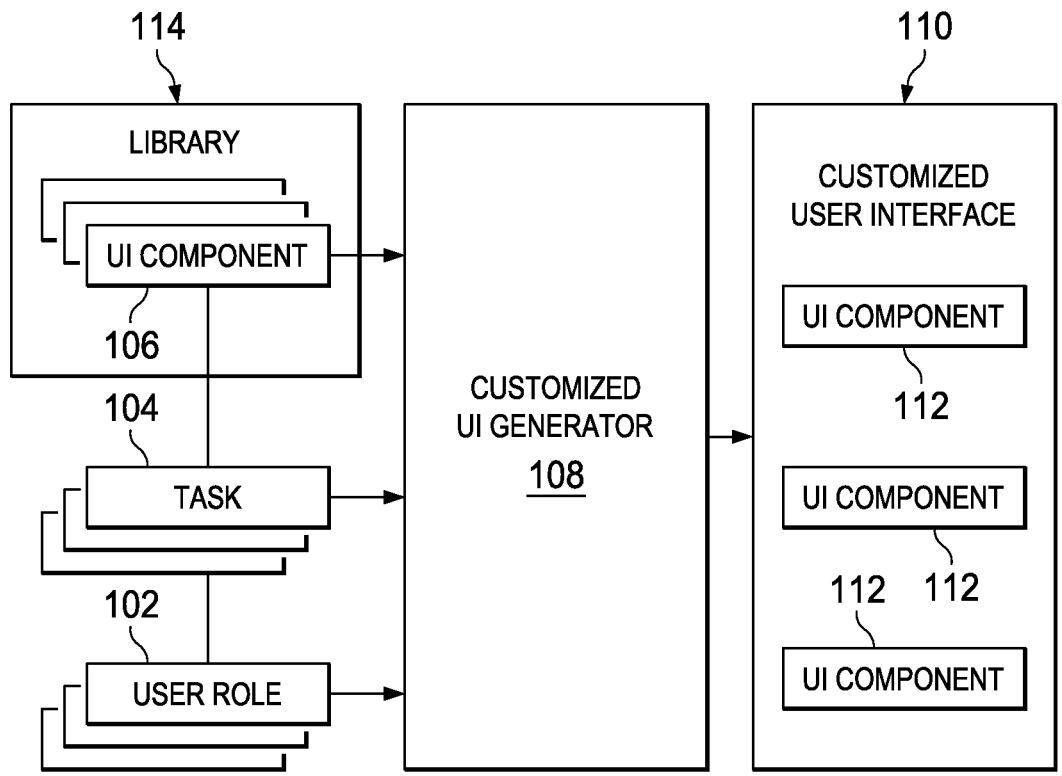
FIG. 1 is a block diagram including a customized user interface generator for generating a customized user interface in the prior art.

FIG. 1 is a block diagram including a customized user interface generator 108 for generating a customized user interface 110 in the prior art. The customized user interface generator 108 is a software or hardware component operable to receive information relating to a user role 102 defining one or more tasks 104 undertaken by users having the user role 102. Each of the tasks 104 is associated with one or more user interface components 106 required to complete the task 104 and fulfil the user role 102.

Each user interface component 106 is a class of user interface control, or a container of controls, suitable for rendering for presentation to a user as part of a complete user interface for a software application. A user interface component 106 can be an individual user interface control, such as a button, entry field, combo-box, window, dialog, etc. Alternatively, a user interface component 106 can be an aggregation of user interface controls such as a group of controls or a predefined layout of controls. Further, a user interface component 106 can be a complete panel, window or dialog including one or more user interface controls. A library 114 is provided as a data structure, data store or other repository for storing a set of user interface components 106. For example, the library 114 can be a class library of user interface components 106. Alternatively, the library 114 can be a database of user interface components 106. Other suitable mechanisms for storing the collection of user interface components 106 such that they are selectively associated with tasks 104 will be apparent to those skilled in the art.

In use, the customized user interface generator 108 identifies one or more user interface components 112 required to complete one or more tasks 104 for a user role 102, and includes the user interface components 112 collectively in a customized user interface 110. The customized user interface 110 includes information for presenting an operable user interface to a user for using a software application. The customized user interface 110 can be embodied as software code including instructions for generating and presenting operable user interface components 112. For example, the customized user interface 110 can be comprised of one or more classes in a runtime programming language such as Java (Java is a registered trademark of Sun Microsystems), including the instantiation of classes corresponding to user interface components 112. Alternatively, the customized user interface 110 can be a specification of a user interface in a specification document such as an XML document, where such specifications are subsequently parsed by a user interface generation component at runtime for rendering and presenting the customized user interface 110. In a further alternative, the customized user interface 110 can be a data structure containing information for each of the user interface components 112 to inform a user interface generation component for the rendering and presenting of the customized user interface 110, including component layout information.

Thus, while the customized user interface generator 108 of the prior art depicted in FIG. 1 is operable to generate a customized user interface 110 dynamically based on user interface components 106 required to complete tasks 104 associated with a user role 102, help information to align with the customized user interface 110 is not readily provided.

Figure 2:
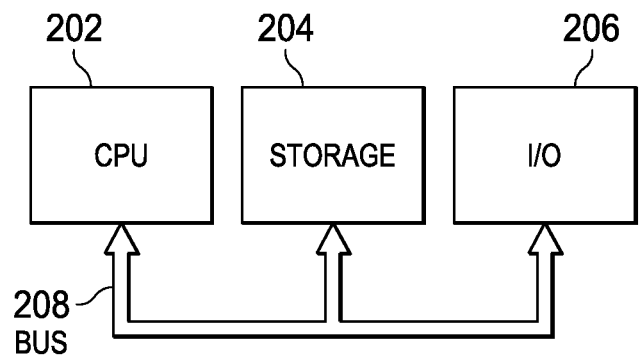
FIG. 2 is a block diagram of a computer system suitable for the operation of embodiments of the present invention.

FIG. 2 is a block diagram of a computer system suitable for the operation of embodiments of the present invention. A central processor unit (CPU) 202 is communicatively connected to a storage 204 and an input/output (I/O) interface 206 via a data bus 208. The storage 204 can be any read/write storage device such as a random access memory (RAM) or a non-volatile storage device. An example of a non-volatile storage device includes a disk or tape storage device. The I/O interface 206 is an interface to devices for the input or output of data, or for both input and output of data. Examples of I/O devices connectable to I/O interface 206 include a keyboard, a mouse, a display (such as a monitor) and a network connection.

Figure 3:
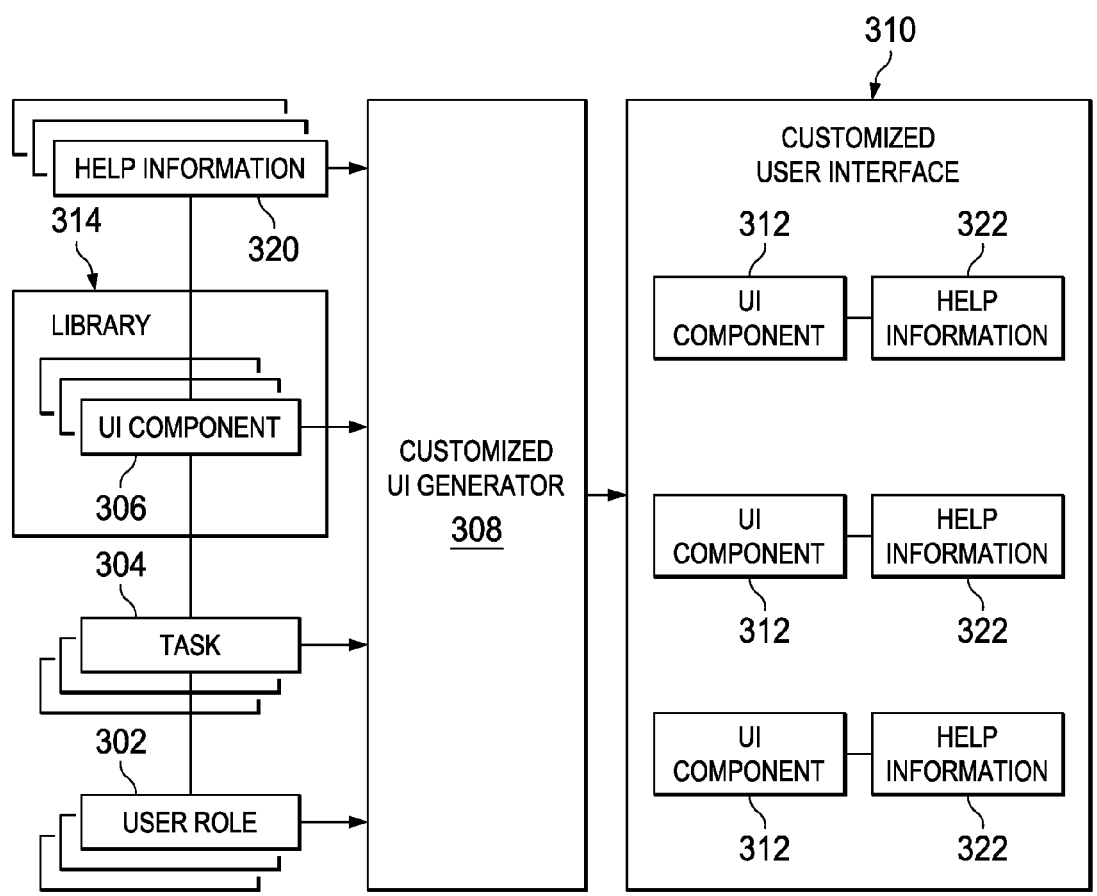
FIG. 3 is a block diagram including a customized user interface generator for generating a customized user interface including help information in accordance with a preferred embodiment of the present invention.

FIG. 3 is a block diagram including a customized user interface generator 308 for generating a customized user interface 310 including component help information 322 in accordance with a preferred embodiment of the present invention. Many of the features in FIG. 3 are identical to those described above with respect to FIG. 1 and these will not be repeated here. FIG. 3 further includes component help information 320 (aka library component help information) associated with each user interface component 306. Component help information 320 is information for providing to a user of a software application to guide the user in the use of a user interface component 306. For example, component help information 320 can include a textual description of the purpose of a user interface component 306, an explanation of data presented within the user interface component 306, guidance on how to operate the user interface component 306, etc. The granularity of the information provided by each item of component help information 320 is such that there is a discrete item of component help information 320 for each user interface component 306. It is conceivable that some user interface components 306 do not require help information and in this case component help information 320 may not be provided for these user interface components. Examples include user interface components 306 that are trivial or that are entirely self explanatory. Similarly, it is possible that a single item of component help information 320 is suitable for association with more than one user interface component 306, such as where two user interface components differ only trivially or in terms of relative context.

The component help information 320 is illustrated as being stored outside the library 314 of user interface components 306. It will be apparent to those skilled in the art that the component help information 320 can alternatively be stored within the library 314 such as, for example, where this provides convenience for associating component help information 320 with user interface components 306.

In use, the customized user interface generator 308 generates the customized user interface 310 substantially as described above with respect to FIG. 1. Additionally, the customized user interface generator 308 is operable to include component help information 322 associated with user interface components 312 included in the customized user interface 310. Component help information 322 is included for each of the user interface components 312 having associated help information. The component help information 322 is illustrated as being constituted within the customized user interface 310, although it will be apparent to those skilled in the art that the component help information 322 can alternatively be stored outside the customized user interface 310 and in association with the user interface components 312 in the customized user interface 310. The component help information 322 for the customized user interface 310 is suitable for aggregating into a complete set of user help information for the entire customized user interface 310. The aggregated user help information is then available for rendering and presentation to a user. Notably, component help information 320 associated with user interface components 306 not included in the customized user interface 310 is not included in the customized user interface 310.

Thus, in this way, only help information relevant to the user interface components 312 within the customized user interface 310 is presented to a user at runtime, providing a source of relevant and dynamic help information for the user that changes in accordance with changes to the customized user interface 310, such as when the customized user interface 310 is changed dynamically.

In a preferred embodiment, the component help information 320 includes a reference or link to an associated user interface component 306 such that, at runtime, help information presented to a user can be presented with an identification of an associated presented user interface component 306. For example, help information for a user interface component 306 including a button control can cause the highlighting of the button control (for example, by rendering a highlight such as a coloured indicator) in association with a presentation of component help information 320 for the user interface component 306 including the button control. Such references stored with component help information 320 can include a pointer, object reference, named reference or other effective association between the component help information 320 and an associated user interface component 306.

Further, in a preferred embodiment, component help information 320 includes information for determining the relative location of help information in the aggregated user help information. For example, relative location information can include an indication of a type of user interface component 306 with which component help information 320 is associated such that help information for user interface components 306 of a similar type are grouped together for presentation to the user as aggregate user help information. For example, all help information for menu items can be presented together.

Further, in a preferred embodiment, component help information 320 includes priority information to inform the presentation of help information in the aggregated user help such that certain component help information 320 is rendered before or after other component help information 320. In this way, help information for more important or significant user interface components 306 can be presented first.

Figure 4:
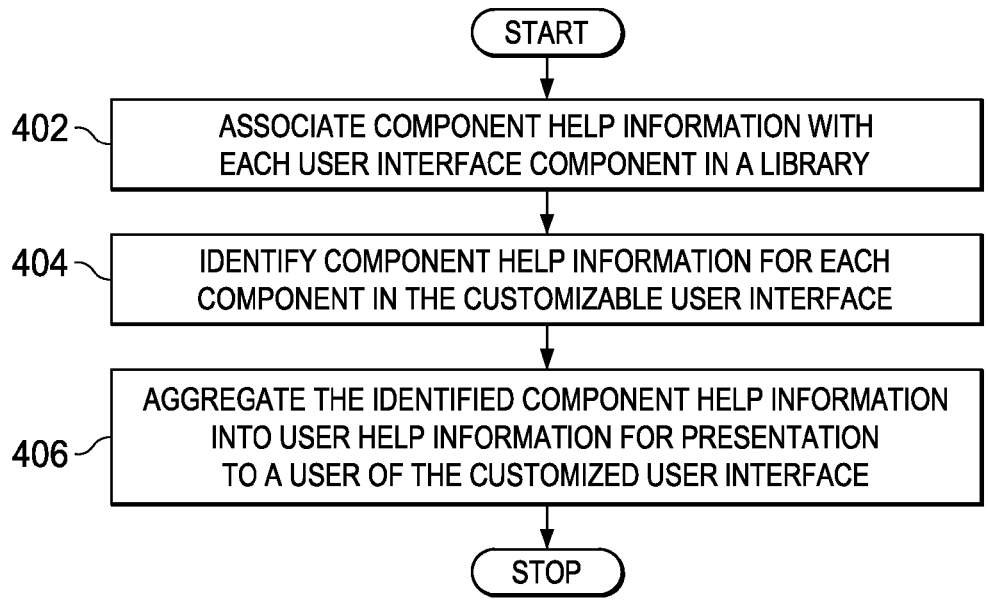
FIG. 4 is a flow chart illustrating a method for generating user help information for a customized user interface in accordance with a preferred embodiment of the present invention.

FIG. 4 is a flow chart illustrating a method for generating user help information for a customized user interface 310 in accordance with a preferred embodiment of the present invention. At step 402 component help information 320 is associated with each user interface component 306 in the library 314. At step 404 component help information 322 for each user interface component 312 in the customized user interface 310 is identified. Subsequently, at step 406, the identified component help information 322 is aggregated into user help information for presentation to a user of the customized user interface 310.

Figure 5:
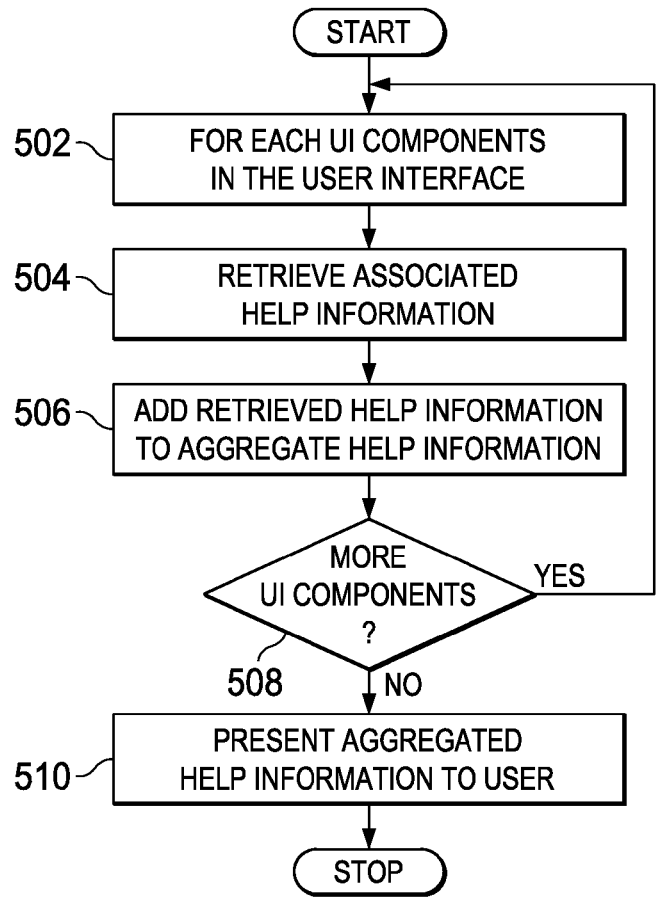
FIG. 5 is a flow chart illustrating a method for generating user help information for a customized user interface in accordance with a preferred embodiment of the present invention.

FIG. 5 is a flow chart illustrating a method for generating user help information for a customized user interface 310 in accordance with a preferred embodiment of the present invention. At step 502 an iteration is used to process each user interface component 312 in the customized user interface 310. At step 504, for a current user interface component 312 associated component help information 322 is retrieved. At step 506 the retrieved component help information 322 is added to an aggregate of help information constituting the user help information. At step 508 the method determines if further user interface components 312 are need to be processed. Finally, at step 510 the aggregated help information is presented to the user as user help information.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk, etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

What is claimed is:

1. An apparatus comprising a data processor and a memory device for generating user help information for a customized user interface, the customized user interface including at least one user interface component from a library of user interface components, the apparatus being configured to perform, responsive to the data processor executing program code stored in the memory device, steps of:
   associating library component help information with each user interface component in the library of user interface components;
   identifying component help information from the library component help information for each component in the customized user interface; and
   aggregating the identified component help information into user help information for presentation to a user of the customized user interface, wherein the component help information includes an indication of a type of user interface control and a priority that are both used when aggregating to order the component help information in the user help information based on the type of user interface control and the priority.

2. The apparatus of claim 1, wherein each user interface component in the library of user interface components includes a definition of at least one user interface control.

3. The apparatus of claim 1, wherein the component help information includes a reference to an associated user interface component for identifying the user interface component.

4. The apparatus of claim 1 further comprising:
   an input/output subsystem; and
   a bus subsystem interconnecting the data processor and the input/output subsystem.

5. A computer program product comprising program code stored on a non-transitory computer-readable storage medium, wherein the program code is executable by a data processor to perform a method for generating user help information for a customized user interface, the customized user interface including at least one user interface component from a library of user interface components, the method comprising steps of:
- associating library component help information with each user interface component in the library of user interface components;
- identifying component help information from the library component help information for each component in the customized user interface; and
- aggregating the identified component help information into user help information for presentation to a user of the customized user interface, including ordering the component help information in the user help information based on a type of user interface control and a priority, wherein the component help information includes an indication of the type of user interface control and the priority.

6. The computer program product of claim 5 further comprising providing a definition of at least one user interface control for each user interface component in the library of user interface components.

7. The computer program product of claim 5 further comprising selecting, from the library of user interface components based on at least one user task to be performed by a user, particular user interface components to be included in the customized user interface.

8. The computer program product of claim 7 further comprising defining, for a user role, the at least one user task.

9. The computer program product of claim 5 further comprising including a reference to an associated user interface component for identifying the user interface component.

10. The computer program product of claim 5 further comprising storing the component help information with the user interface components in the library of user interface components.

11. The apparatus of claim 1, wherein the library of user interface components comprises a plurality of the user interface components that are presentable to a user of the customized user interface.

12. The apparatus of claim 6, further comprising:
presenting the customized user interface to the user.

13. The apparatus of claim 1, further comprising:
presenting the customized user interface to the user.

\* \* \* \* \*